US011634018B2

(12) United States Patent
Sentani et al.

(10) Patent No.: US 11,634,018 B2
(45) Date of Patent: Apr. 25, 2023

(54) WEATHERSTRIP

(71) Applicant: NISHIKAWA RUBBER CO., LTD., Hiroshima (JP)

(72) Inventors: Haruki Sentani, Hiroshima (JP); Satoshi Maesaki, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 17/190,963

(22) Filed: Mar. 3, 2021

(65) Prior Publication Data
US 2021/0284004 A1  Sep. 16, 2021

(30) Foreign Application Priority Data

Mar. 13, 2020  (JP) .............................. JP2020-044295

(51) Int. Cl.
*B60J 10/00* (2016.01)
*B60J 10/36* (2016.01)
*B60J 10/15* (2016.01)

(52) U.S. Cl.
CPC ............... *B60J 10/36* (2016.02); *B60J 10/15* (2016.02)

(58) Field of Classification Search
CPC ... B60J 10/36; B60J 10/30; B60J 10/24; B60J 10/74; B60J 10/27; B60J 10/78; B60J 10/21; B60J 10/86
USPC .............................................. 49/479.1, 492.1
See application file for complete search history.

(56) References Cited

U.S. PATENT DOCUMENTS

| 2007/0101656 | A1* | 5/2007 | Stipp | B60J 10/30 49/490.1 |
| 2009/0007498 | A1* | 1/2009 | Araki | B60J 10/30 49/483.1 |
| 2017/0113528 | A1* | 4/2017 | Kawase | B60J 10/40 |
| 2020/0114744 | A1* | 4/2020 | Matsuura | B60J 10/36 |

FOREIGN PATENT DOCUMENTS

| CN | 202847638 | * | 4/2022 |
| JP | H3-42449 U | | 4/1991 |
| JP | H5-40018 U | | 5/1993 |
| JP | H7-266879 A | | 10/1995 |
| JP | 2006-502048 A | | 1/2006 |

* cited by examiner

*Primary Examiner* — Daniel J Troy
*Assistant Examiner* — Daniel Alvarez
(74) *Attorney, Agent, or Firm* — Procopio Cory Hargreaves and Savitch LLP; Pattric J. Rawlins

(57) ABSTRACT

The weatherstrip includes a molded part formed from an elastic material and the molded part has an insert panel embedded therein. The molded part includes: a molded part through hole in which a clip for attaching the molded part to a vehicle body can be inserted; and a thinner portion provided in an outer peripheral portion of the molded part through hole and having a thickness smaller than that of other portions of the molded part in an area of the molded part where the insert panel is embedded in. The insert panel includes a clip through hole provided at a location corresponding to the molded part through hole and having a diameter larger than that of the molded part through hole; and a first additional through hole provided spaced from the clip through hole in an area corresponding to the thinner portion.

9 Claims, 10 Drawing Sheets

WEATHERSTRIP

CROSS-REFERENCE TO RELATED APPLICATION

This application claims priority from Japanese Patent Application No. 2020-044295 filed on Mar. 13, 2020, which is incorporated herein by reference in its entirety and for all purposes.

BACKGROUND

The present invention relates to a weatherstrip for automobiles, and more particularly, to a weatherstrip in which an insert panel is embedded.

A weatherstrip provided in a peripheral edge portion of a vehicle door has straight parts and corner parts which are formed substantially along a shape of the door. Generally, the straight parts are formed using extrusion molding, and the corner parts are formed using molding (injection molding), and end portions of the corner parts (molded part) and the straight parts (extruded part) are then joined to complete the weatherstrip. In the molded part where it is also necessary to provide a planar portion to form by means of molding, an insufficiently stiff portion occurs in a part of the shape more frequently than in the extruded part. For this reason, an insert panel formed from a hard resin material may be embedded in the molded part for reinforcement. For the weatherstrip in which the insert panel is embedded, the insert panel is secured beforehand within a hollow portion (cavity) of a mold when the molded part is molded and then embedded in the molded part by injecting an elastic material, such as rubber, resin, to form the molded part.

Generally, the planar portion of the weatherstrip is attached to a vehicle body, such as a door panel, by means of a clip. The planar portion of the weatherstrip thus includes a through hole for inserting the clip. In the planar portion of the weatherstrip having the insert panel embedded in, the insert panel also includes a through hole for the clip. As a weatherstrip in which a conventional insert panel is embedded, Japanese Laid-Open Utility Model Publication No. H03-42449 discloses a prior art example of a planar portion of the weatherstrip. The planar portion has the insert panel embedded therein and is attached to an outer panel of a pillar by means of clips. It is then described in JPH03-42449 that since the planer portion has a generally constant thickness, the clips (head parts of the clips) create unevenness on the formed outer surface and thereby, impair the appearance of a vehicle. (See FIGS. 6 and 7 of JPH03-42449.)

Japanese Laid-Open Utility Model Publication No. H05-40018 also discloses an example of a planar portion of a weatherstrip. The planar portion has a metal core embedded therein and is attached to an inner panel of a door by means of a clip. The planar portion has a thickness such that a portion of the planar portion on which the clip (a head part of the clip) is attached is made as a thinner portion as compared to portions away from the clip (the head part of the clip). This configuration eliminates the situation where the clip (the head part of the clip) creates unevenness on the formed outer surface and impairs the appearance of a vehicle, as described in JPH03-42449. The thinner portion is generally called a seat (for the clip). (See FIGS. 4 and 8 of JPH05-40018.)

Further, Japanese Laid-Open Patent Publication No. H07-266879 discloses a weatherstrip in which a through hole of an insert panel for a clip has an inner diameter larger than that of a through hole of the weatherstrip for the clip (see FIGS. 4 of JPH07-266879).

When a molded part of the conventional weatherstrip as described in JPH07-266879 is produced, the insert panel is inserted beforehand within a cavity, followed by introduction of an elastic material to form the molded part, as described above. In doing so, the elastic material flows through the through hole of the insert panel for the clip to be divided onto front and back sides of the insert panel. As a result, the elastic material is formed to spread over the front and back sides of the insert panel.

Then, Japanese Laid-Open Patent Publication No. 2006-502048 describes that in a molded part of a conventional weatherstrip shown in FIGS. 13 to 16 of JP2006-502048, a stiff member (insert) embedded in the molded part has a larger circular hole in which a clip passes through and which is surrounded by eight smaller circular holes, and a material of the molded part passes through the eight smaller circular holes to improve securing and positioning of the stiff member (insert).

SUMMARY

In recent years, a general-purpose clip of a type where the distance between head and locking parts is smaller is used as a clip for attaching the weatherstrip to a vehicle body, such as a door panel, to share components. Although the molded part of the weatherstrip is preferably to all have an equal thickness, it is then necessary to subtract the thickness of the insert panel in a portion of the molded part having the insert panel embedded in. Then, it is necessary that the clip is able to be attached to the planar portion of the molded part, by reducing the thickness of the elastic material around the through hole (molded part through hole) for the clip in the portion of the molded part having the insert panel embedded in, in order to prevent the increase in thickness of the portion.

In the case where the general-purpose clip is used in the weatherstrip as described in JPH07-266879, an outer peripheral portion of the molded part through hole should be a thinner portion having a thickness smaller than that of other portions of the molded part, as might be expected. In this respect, such configuration results in a passageway of the elastic material, which is defined by the insert panel and the mold, being narrower around the outer peripheral portion of the molded part through hole, when the molding is performed. In addition, the insert panel as described in JPH07-266879 has only one through hole and thus the elastic material poorly flows in a portion of the passageway corresponding to the thinner portion, leading to accumulation of gas. This results in molding defects of the molded part in the outer peripheral portion of the molded part through hole, thereby causing the insert panel to be exposed.

Then, in the stiff member (insert) of the weatherstrip as described in JP2006-502048, the larger circular hole in which a clip passes through and the eight smaller circular holes which surround the larger circular hole have the following dimensional relationship:
(1) a spacing (distance) among the eight smaller circular holes larger than the diameter of the eight smaller circular holes;
(2) a spacing (distance) between the smaller circular holes and the larger circular hole larger than the diameter of the eight smaller circular holes.

According to the item (1), the material of the molded part can be said to flow through portions (length) penetrating from the front side to the back side smaller than those (length) not penetrating, in an area where the eight smaller circular holes are provided. This allows the flow of the material of the molded part to slightly improve over JPH07-266879. However, the flow is still considered insufficient. Then, according to the item (2) and FIG. 13 of JP2006-502048, the eight smaller circular holes can be seen as being located not at a location corresponding to a thinner portion to which the head part of the clip is attached, but at a location corresponding to a sloping part located in an outer peripheral portion of the thinner part or to a thickening portion located in a further outer peripheral portion away from the sloping part. Thus, issues and solutions in the case of using the clip of the type where the dimensions of the head and locking parts are smaller have neither reported nor disclosed. Molding defects of the molded part also may occur in the weatherstrip described in JP2006-502048 at the outer peripheral portion of the molded part through hole to thus expose the insert panel, as in that of JPH07-266879, in the case of using the general-purpose clip of the type where the dimensions of the head and locking parts are smaller.

The present disclosure is made in view of the foregoing problems and an object of the present disclosure is to prevent molding defects of the weatherstrip caused by gas accumulated within the cavity of the mold during molding of the weatherstrip, even when the thinner portion is provided around the through hole for the clip.

To achieve the object, the present disclosure provides in an area corresponding to the thinner portion of the molded part a first additional through hole spaced from the through hole for the clip.

Specifically, a weatherstrip according to the present disclosure includes a molded part formed from an elastic material, the molded part having an insert panel embedded therein, the molded part including: a molded part through hole in which a clip for attaching the molded part to a vehicle body can be inserted; and a thinner portion provided in an outer peripheral portion of the molded part through hole and having a thickness smaller than that of other portions of the molded part in an area of the molded part where the insert panel is embedded in, wherein the insert panel includes: a clip through hole provided at a location corresponding to the molded part through hole and having a diameter larger than that of the molded part through hole; and a first additional through hole provided spaced from the clip through hole in an area corresponding to the thinner portion, and wherein the elastic materials located on a front side and a back side of the insert panel to form the molded part connect one another through the first additional through hole.

In the weatherstrip according to the present disclosure, a general-purpose clip can be used since the thinner portion having the thickness smaller than that of the other portions of the molded part in the area of the molded part where the insert panel is embedded in is provided in the outer peripheral portion of the molded part through hole, and passageways of the elastic material for molding are added up and flowability of the elastic material is thus improved, by providing in the area corresponding to the thinner portion the first additional through hole spaced from the clip through hole. As a result, gas is less likely to be accumulated in the cavity of the mold and molding defects of the molded part in the outer peripheral portion of the molded part through hole can be prevented. Moreover, the elastic materials on the front and back sides of the insert panel can connect through the first additional through hole and thus, the connected part of the thinner portion increases in thickness to enable reinforcement of the thinner portion.

In the weatherstrip according to the present disclosure, the first additional through hole includes a plurality of first additional through holes, and a total of lengths of the plurality of first additional through holes is preferably determined to be larger than a total of spacings among the plurality of first additional through holes.

In this way, the connected part of the thinner portion where the elastic materials on the front and back sides of the insert panel connect is greater in length than the unconnected part, enabling further added passageways of the elastic material for molding and further improved flowability of the elastic material.

In the weatherstrip according to the present disclosure, the insert panel preferably includes a mold abutting protrusion protruding vertically from the front side or the back side of the insert panel on an outer peripheral portion of the area corresponding to the thinner portion, to abut the mold.

In this way, when the elastic material is introduced into the cavity for molding of the molded part, the abutment of the mold abutting protrusion against the mold can prevent the insert panel from being misaligned toward an upper mold or a lower mold by the introduced elastic material.

In the weatherstrip according to the present disclosure, the insert panel preferably further includes a second additional through hole in the outer peripheral portion of the area corresponding to the thinner portion.

In that way, passageways of the elastic material flowing between the insert panel and the mold are further added up and thus flowability of the elastic material is further improved, during molding. Moreover, this leads to increased areas where the elastic materials on the front and back sides of the insert panel can connect through the second additional through hole, thus further improving reinforcement effects in the outer peripheral portion of the molded part through hole.

In the weatherstrip according to the present disclosure, molding defects of the molded part in the outer peripheral portion of the molded part through hole can be prevented.

DETAILED DESCRIPTION

Embodiments of the present disclosure are described below with reference to the drawings. The following description of preferred embodiments is merely an example in nature, and is not intended to limit the present disclosure, application methods of the present disclosure, or use of the present disclosure.

Figure 1:
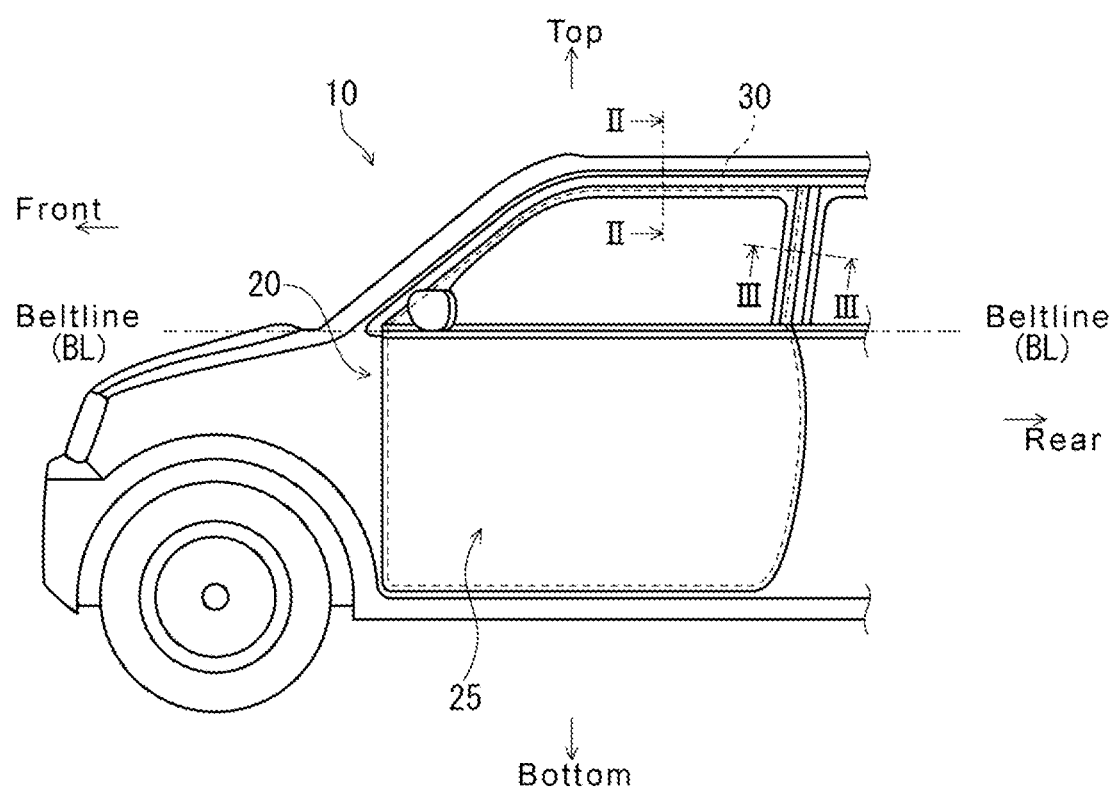
FIG. 1 is a left side view of an automobile.

In an automobile illustrated in FIG. 1, reference numeral 10 represents a vehicle body, reference numeral 20 represents a front door, and reference numeral 30 represents a weatherstrip provided on a peripheral edge portion of the front door 20. The front door 20 then includes a door main body 25 below a beltline BL, and a top side door frame 21 and a vertical side door frame 23 connected integral as one piece, above the door main body 25 and the beltline BL.

Figure 2:
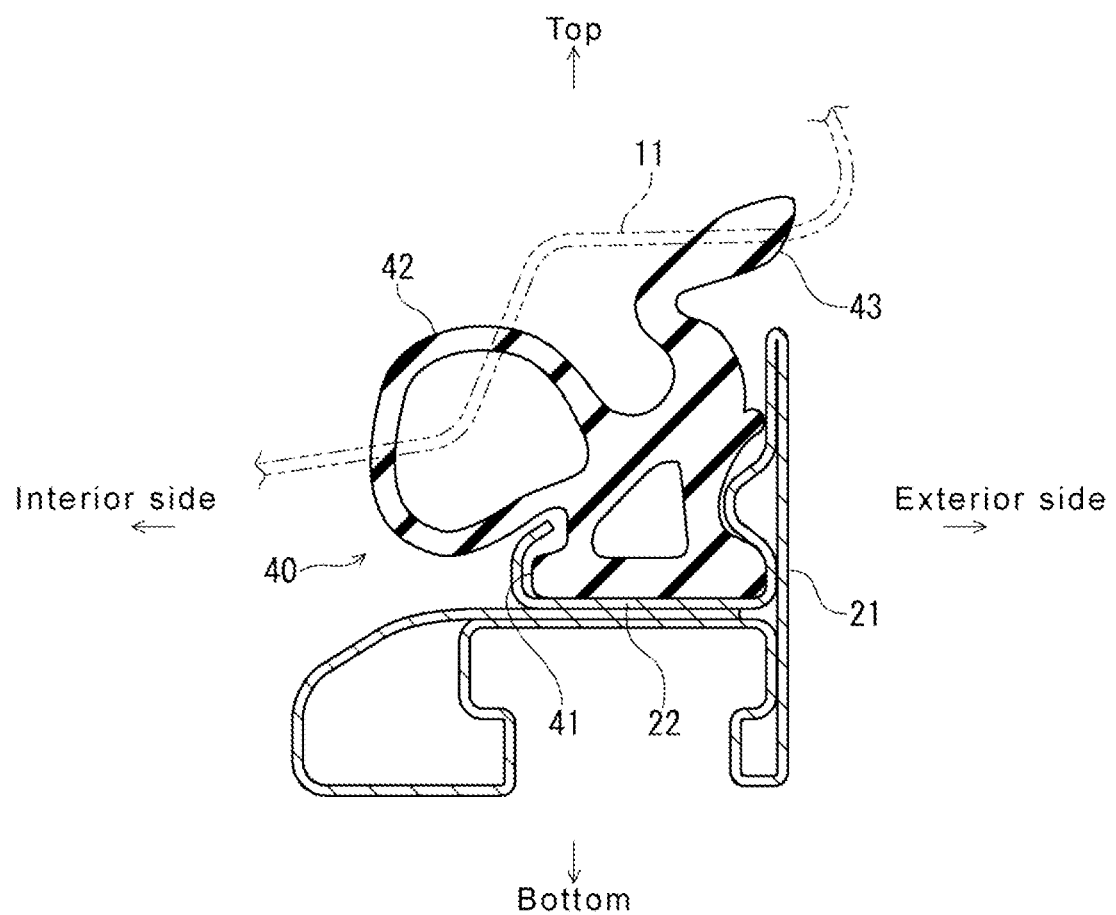
FIG. 2 is a cross-sectional view taken along a line II-II in FIG. 1.

As illustrated in FIG. 2 which is a cross section taken along the line II-II in FIG. 1, a top side part of the weatherstrip 30 is attached to the top side door frame 21 constituting the front door 20. A top side extruded part 40 of the weatherstrip 30 includes a top side attachment base 41, and a top side hollow seal wall 42 formed integrally with an inner cabin side of the top side attachment base 41 and configured to make elastic contact with an interior protrusion step of a top side door opening edge 11 of the vehicle body 10 to seal between the interior and exterior of the vehicle when the front door 20 is closed. Further, the top side extruded part 40 includes a top side sub-lip 43 being tongue-shaped in a cross-sectional view, projecting from an outer cabin side of the top side attachment base 41, and configured to make elastic contact with an exterior protrusion step of the top side door opening edge 11 of the vehicle body 10 to seal between the interior and exterior of the vehicle when the front door 20 is closed. The top side extruded part 40 of the weatherstrip 30 is attached to the top side door frame 21 by mounting the top side attachment base 41 to a top side attachment portion 22 which is included in the top side door frame 21 and generally U-shaped to open upwardly.

Figure 3:
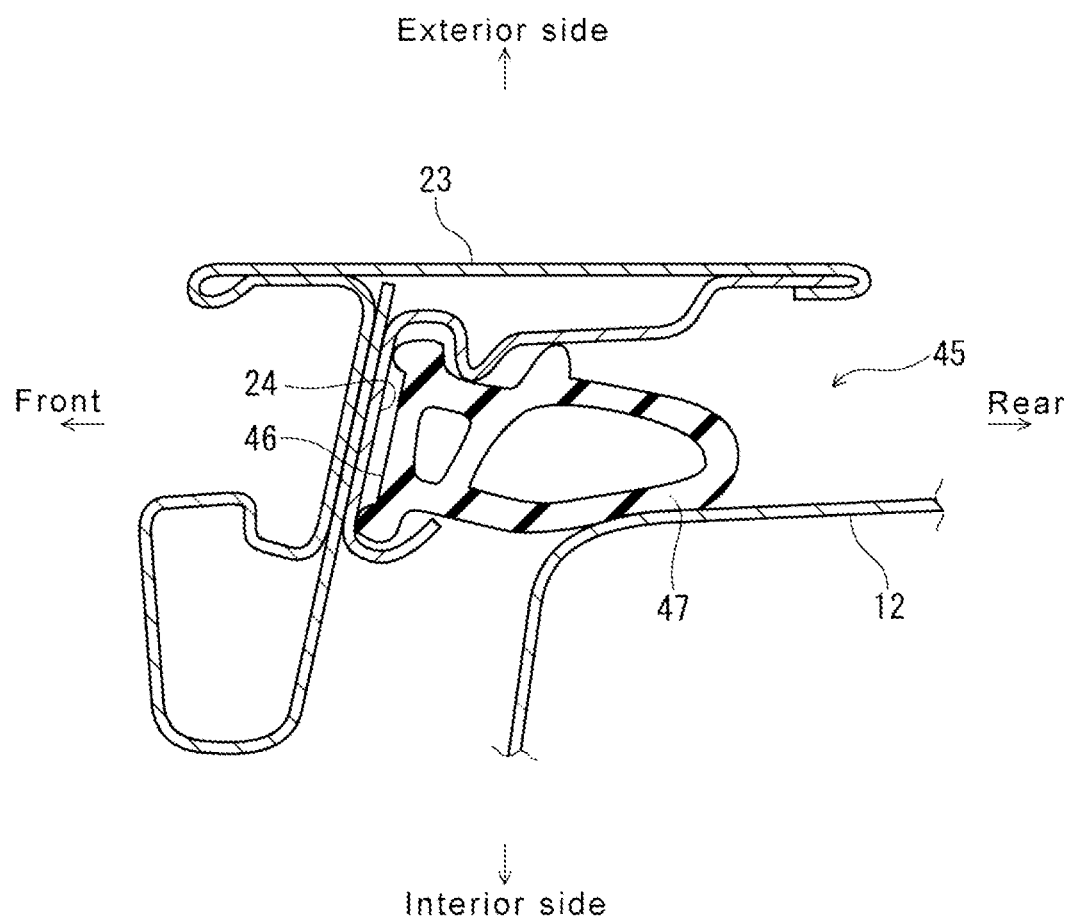
FIG. 3 is a cross-sectional view taken along a line in FIG. 1.

As illustrated in FIG. 3 which is a cross section taken along the line in FIG. 1, a vertical side extruded part 45 of the weatherstrip 30 extending vertically has the same mounting form to the vertical side door frame 23 as that of the top side one. As illustrated in FIG. 3, in the vertical side extruded part 45 of the weatherstrip 30, a vertical side attachment base 46 is mounted to a vertical side attachment portion 24 included in the vertical side door frame 23 and being generally U-shaped to open rearwardly, and a vertical side hollow seal wall 47 projecting from the vertical side attachment base 46 is configured to make elastic contact with a protrusion step of a vertical side door opening edge 12 to seal between the interior and exterior of the vehicle.

Figure 4:
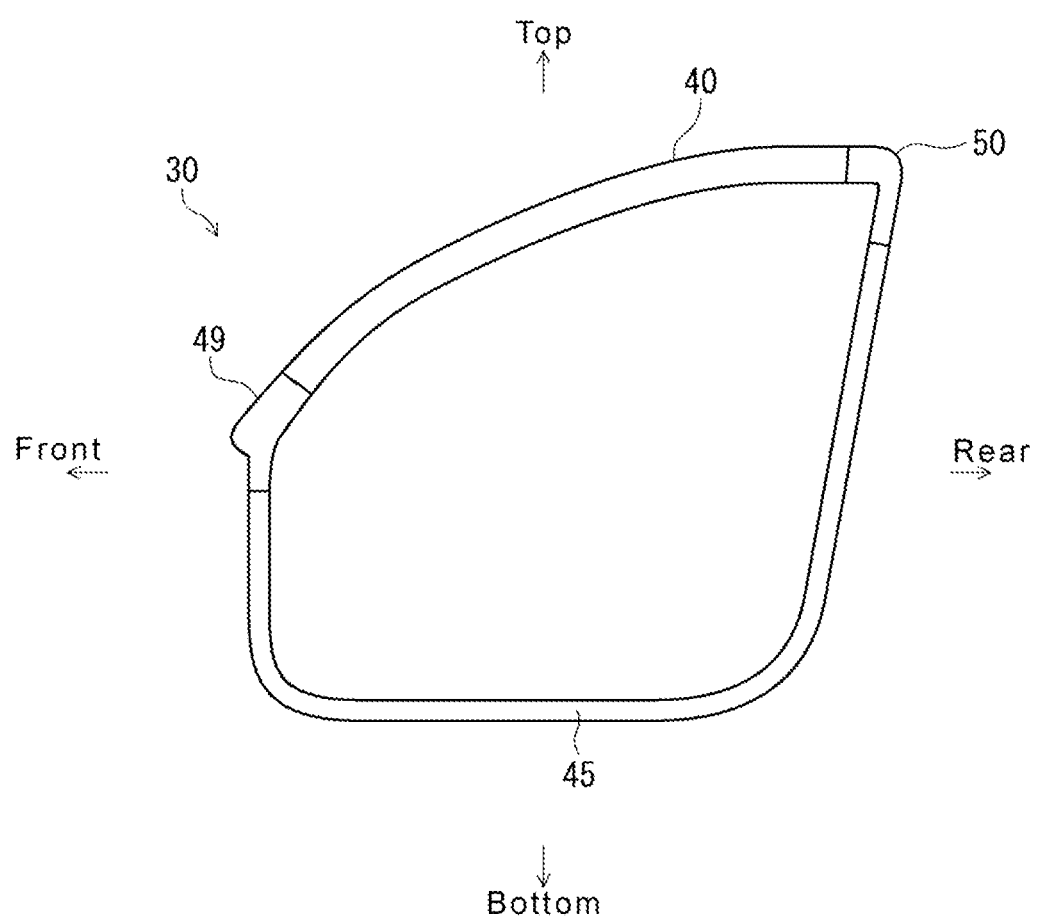
FIG. 4 is a left side view of a weatherstrip according to one embodiment of the present disclosure, illustrating a side view from an exterior of a vehicle.

FIG. 4 is a left side view of the weatherstrip 30 according to one embodiment of the present disclosure, illustrating a side view from the exterior of the vehicle. As illustrated in FIG. 4, the weatherstrip 30 according to the embodiment includes the top side extruded part 40 that is a portion for attaching to the top side door frame 21 of the front door 20 and is formed using extrusion molding, and the vertical side extruded part 45 that is a portion for attaching to the vertical side door frame 23 of the front door 20 located rearwardly of the top side door frame 21, and is formed using extrusion molding. The weatherstrip 30 further includes a front side molded part 49 that is a portion for attaching to a front corner portion of the front door 20 and is formed using molding, and a rear side molded part 50 that is a portion for attaching to a rear corner portion of the front door 20 and is formed using molding. While the front side molded part 49 connects front ends of the top side extruded part 40 and the vertical side extruded part 45, the rear side molded part 50 connects rear ends of the top side extruded part 40 and the vertical side extruded part 45.

Figure 5:
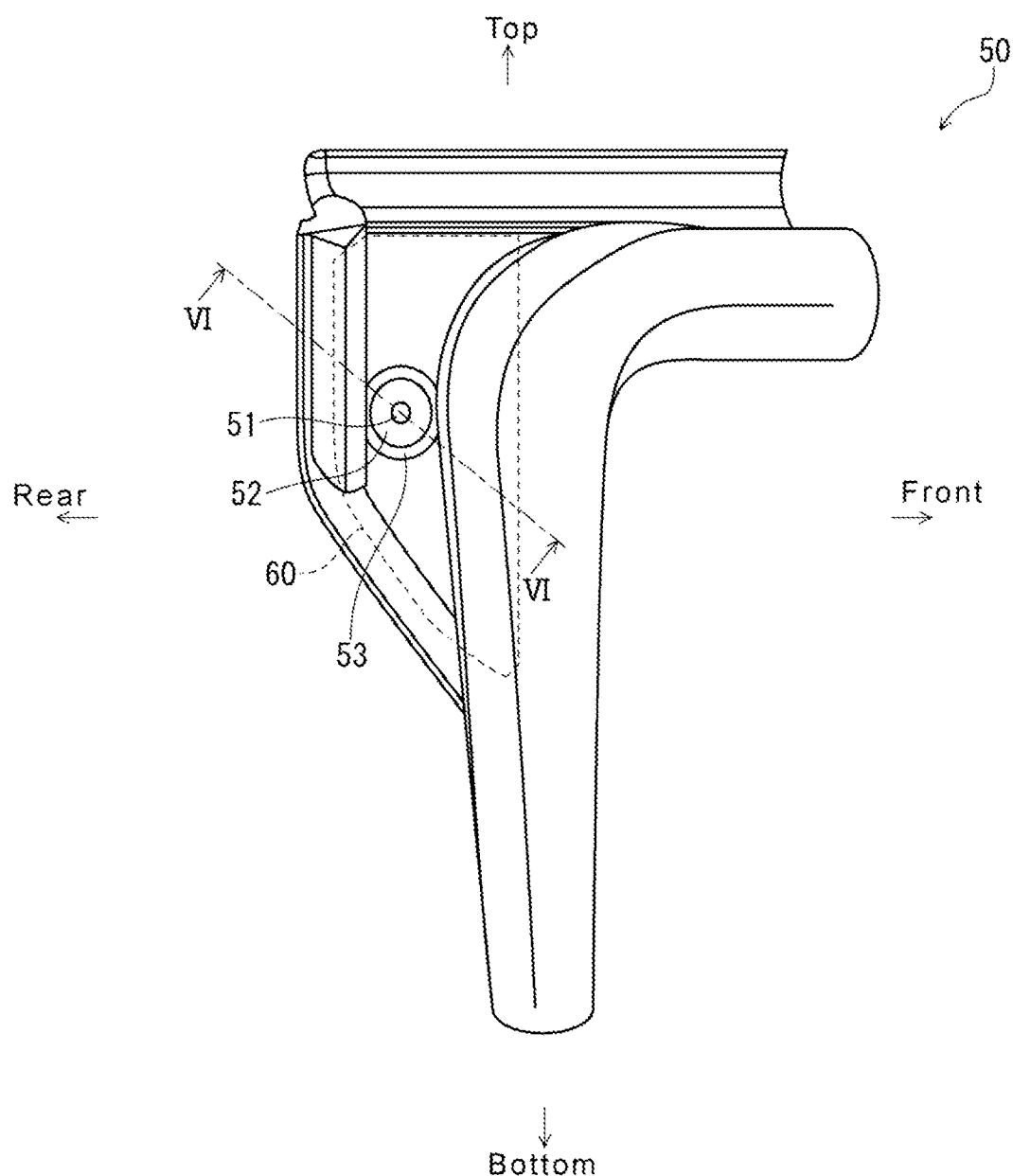
FIG. 5 is a left-side perspective view of a molded part of the weatherstrip according to one embodiment of the present disclosure, illustrating a side view from an interior of the vehicle.
Figure 6:
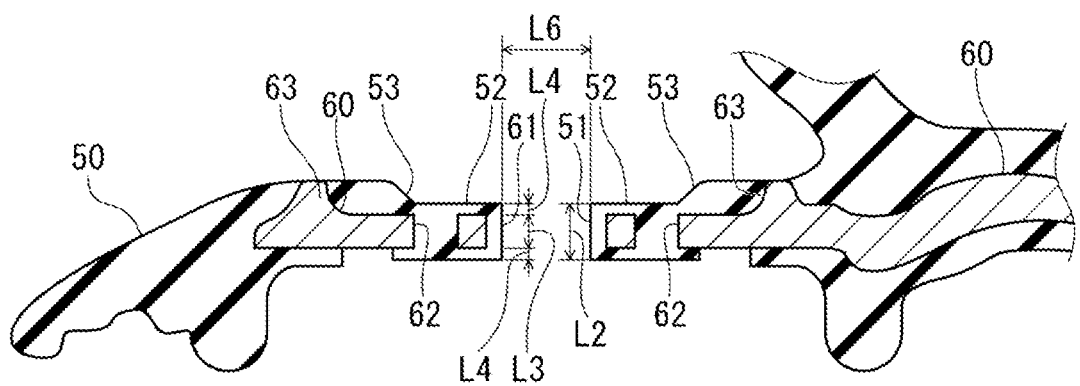
FIG. 6 is a cross-sectional view taken along a line VI-VI in FIG. 5.

FIG. 5 is a left-side perspective view of the rear side molded part 50 of the weatherstrip 30 shown in FIG. 4, illustrating a side view from the interior of the vehicle, and is also one embodiment of the present disclosure. FIG. 6 is a cross-sectional view taken along the line VI-VI in FIG. 5. As illustrated in FIGS. 5 and 6, the molded part 50 of the weatherstrip 30 according to the embodiment includes a molded part through hole 51 configured to attach a clip used for attachment to the peripheral edge portion of the front door 20. A thinner portion 52 smaller in thickness than other portions of the rear side molded part 50 is formed in an outer peripheral portion of the molded part through hole 51. A sloping portion 53 progressively smaller in thickness toward the thinner portion 52 is formed in an outer peripheral portion of the thinner portion 52. An insert panel 60 for reinforcement of the rear side molded part 50 is then embedded in the rear side molded part 50. The other portions of the rear side molded part 50 as described herein particularly mean other portions of the rear side molded part 50 in an area of the rear side molded part 50 where the insert panel 60 is embedded in. FIG. 5 only indicates an outer edge of the insert panel 60 with broken lines to avoid ambiguity in the view.

The thinner portion 52 is provided to allow use of a general-purpose clip 70. When the general-purpose clip 70 is used, the dimension from a head part 71 to a locking part 72 of the clip 70 is predetermined (see dimension L1 indicated in FIG. 7B) and thus, the thinner portion 52 of the weatherstrip 30 for a portion where the clip 70 is attached to has an overall thickness L2 necessary to be equal to, or smaller than the dimension L1 (L1>L2). Moreover, in the portion where the insert panel 60 is embedded in, a thickness L4 calculated by dividing by two, which are front and back sides, a thickness obtained by subtracting a thickness L3 of the insert panel 60 from the overall thickness L2 of the thinner portion 52, is a substantial thickness of a skin portion of the elastic material of the thinner portion 52 (L4=(L2−L3)/2). The dimension L1 of the general-purpose clip 70 being sufficiently large may not be particularly problematic. However, when L1 is smaller, L4 may need to be smaller and be problematic.

The weatherstrip 30 according to the embodiment may be formed by the following steps. First, end portions of the top side extruded part 40 and the vertical side extruded part 45 are each set on a mold (not shown). In this instance, the insert panel 60 formed from a hard resin material is also set in a cavity K which is a space in the mold. Thereafter, by injecting into molds 80, 90 the elastic material, such as rubber, resin, for forming the molded part 50 of the weatherstrip 30, the rear side molded part 50 is formed while the insert panel is embedded within the rear side molded part 50. Concomitantly with the completion of forming the rear side molded part 50, the end portions of the top side extruded part 40 and the rear side molded part 50, as well as the end portions of the vertical side extruded part 45 and the rear side molded part 50 are then connected within the molds. Then, the front side molded part 49 can be also molded (not shown) in the same steps to form the weatherstrip 30 as one piece. The materials used for the top side extruded part 40, the rear side molded part 50, and the vertical side extruded part 45 of the weatherstrip 30 are not particularly limited. Generally, EPDM sponge rubber (of a specific gravity of approximately 0.4 to 0.6) for the case of rubber, and a thermoplastic elastomer (TPE), such as TPO, for the case of a resin are used. The hard resin material used for the insert panel 60 includes, but not particularly limited to, resin materials mixed with a reinforcement material, for example, PP (polypropylene) containing talc and PA (polyamide) containing glass fibers.

Figure 7A:
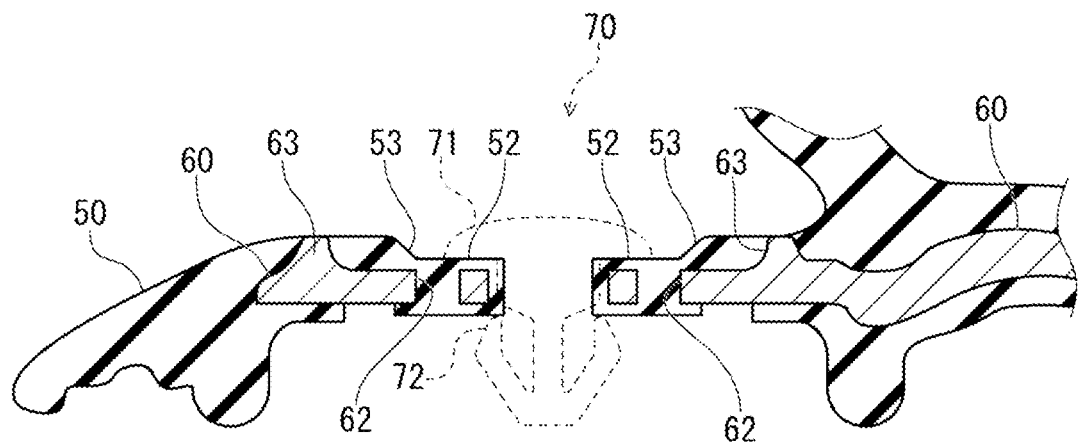
FIG. 7A is a view illustrating a state where a clip is inserted in a molded part through hole of the weatherstrip shown in FIG. 6.
Figure 7B:
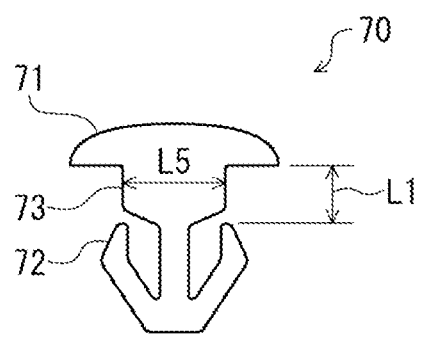
FIG. 7B is a view illustrating only the shape of the clip.
Figure 8:
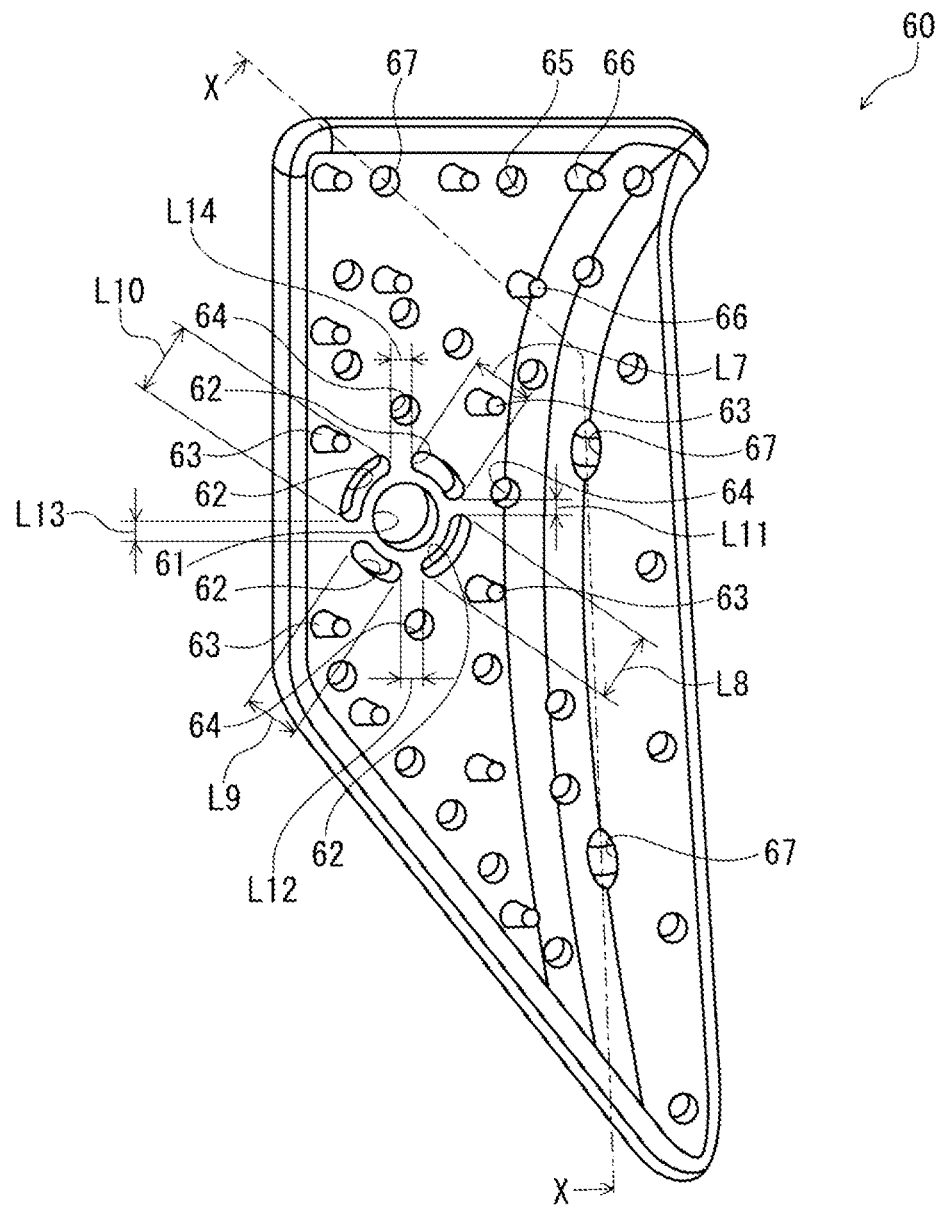
FIG. 8 is a left-side perspective view of an insert panel embedded in the weatherstrip according to one embodiment of the present disclosure, illustrating a side view from the interior of the vehicle.

Next, the insert panel 60 will be described in detail with reference to FIGS. 6 to 8. As illustrated in FIGS. 6 to 8, the insert panel 60 includes a clip through hole 61 having a diameter larger than that of the molded part through hole 51 and provided at a location corresponding to the molded part through hole 51 when embedded in the rear side molded part 50. Particularly, the molded part through hole 51 and the clip through hole 61 are concentrically positioned. Thus, the molded part through hole 51 of the weatherstrip 30 and the clip through hole 61 of the insert panel 60 are in communication with each other, so that the clip 70 passes therethrough to be further inserted into a clip attachment hole provided in the door 20 (not shown), thereby allowing the rear side molded part 50 of the weatherstrip 30 to attach to the door 20. By making the diameter of the clip through hole 61 larger than that of the molded part through hole 51, the elastic materials on the front and back sides of the insert panel 60 can also connect together in an area from an inner peripheral surface of the molded part through hole 51 to an inner peripheral surface of the clip through hole 61, thus enabling an increase of overall thickness to improve stiffness of an inner peripheral portion of the molded part through hole 51. As a result, the elastic material in the inner peripheral portion of the molded part through hole 51 of the weatherstrip 30 coming off due to the interference with the clip 70 can be prevented at the time of the attachment to the vehicle body by the clip 70.

As illustrated in FIGS. 6 and 7, it is preferred that the elastic material is located in the inner peripheral portion of the molded part through hole 51 and a diameter L5 of a body part 73 connecting integrally the head part 71 and the locking part 72 of the clip is also determined to be larger than a diameter L6 of the molded part through hole 51. Such configuration enables the body part 73 of the clip 70 to make elastic contact with the elastic material located in the inner peripheral portion of the molded part through hole 51 when the clip 71 is inserted in the molded part through hole 51, allowing the clip 70 to be less likely to fall off from the molded part through hole 51.

As illustrated in FIGS. 6 to 8, the insert panel 60 has a first additional through hole 62 which is a though hole provided spaced from the clip through hole 61 in an outer peripheral portion of the clip through hole 61, particularly in a location corresponding to the thinner portion 52 of the rear side molded part 50. In the embodiment, as illustrated in FIG. 8, four of the first additional through holes 62 are formed at equal intervals along the outer periphery of the clip through hole 61, and formed in a generally obround shape to curve along the outer periphery of the clip through hole 61. In this respect, the number and shape of the first additional through holes 62 are not particularly limited to this configuration when the first additional through holes 62 are provided spaced from the clip through hole 61 in the location corresponding to the thinner portion 52.

In this regard, if the four first additional through holes 62 as illustrated in FIG. 8 are connected to produce one generally C-shaped, elongated first additional through hole, a resin material portion constituting the insert panel 60 is decreased to a great extent and the stiffness of the insert panel 60 is reduced. This may cause a breakage of a resin material portion between both ends of the first additional through hole being generally C-shaped, due to pressure of injection of the molding material and therefore, this configuration is not preferred. While a greater length between both ends of the first additional through hole being generally C-shaped can be contemplated to prevent such breakage, it is not preferred in view of balancing injection of the molding material (not shown). Two of the four first additional through holes 62 as illustrated in FIG. 8 may be at least connected to produce two first additional through holes 62. In that case, there exists two resin material portions between the two first additional through holes 62 to prevent excessive reduction of the stiffness of the insert panel 60 and to enable balanced injection of the molding material, and therefore, this configuration is preferred (not shown).

While neither shown nor described, three or five first additional through holes 62 may also be provided. The four first additional through holes 62 then have a substantially same length and spacings of four connecting portions are also substantially same in FIG. 8; however, a plurality of the first additional through holes 62 may not have the same length and spacings among the plurality of the first additional through holes 62 may not be the same. In addition, the four first additional through holes 62 have respective lengths L7, L8, L9, and L10 and the spacings among the four first additional through holes 62 are respectively L11, L12, L13, and L14 in FIG. 8. The total of the lengths of the four first additional through holes 62 (L7+L8+L9+L10) is then determined to be larger than the total of the spacings among the four first additional through holes 62 (L11+L12+L13+L14). The length of the first additional through hole 62 herein designates the distance between two points spaced furthest away from one another at the outer peripheral edge of the first additional through hole 62. The spacing between the first additional through holes 62 herein designates the distance between two closest points of the outer peripheral edges of adjacent first additional through holes 62.

The first additional through holes 62 are provided in the outer peripheral portion of the clip through hole 61 and thereby, molding defects of the thinner portion 52 during molding of the rear side molded part 50 can be prevented. The reasons of the prevention will be described below. As described above, the rear side molded part 50 is formed by setting the insert panel 60 in the cavity K of the molds 80, 90 shown in FIG. 9 and then injecting the elastic material for forming the rear side molded part 50. In doing so, the elastic material passes through the clip through hole 61 and flows into an area for forming the thinner portion 52 to be divided onto the front and back sides of the insert panel 60. In particular, in the case where the first additional through holes 62 are not provided, the elastic material can move only from the clip through hole 61 toward the area for forming the thinner portion 52 so as to be divided onto the front and back sides of the insert panel 60, at the area for forming the thinner portion 52 where a space between the insert panel 60 and the molds 80, 90 is particularly narrower. This may cause lower flowability of the elastic material and accumulation of gas in this area. As a result, molding defects of the thinner portion 52 as illustrated in FIG. 6 may occur. On the other hand, as illustrated in FIG. 6, in the case where the first additional through holes 62 are provided, the elastic material can move not only from the clip through hole 61 but also from the first additional through holes 62 toward the area for forming the thinner portion 52 so as to be divided onto the front and back sides of the insert panel 60, thus resulting in added passageways of the elastic material and thus improved flowability of the elastic material. As a result, gas is less likely to be accumulated in the cavity K of the molds 80, 90 and molding defects of the thinner portion 52 as illustrated in FIG. 6 can be prevented. When the first additional through holes 62 are provided, the elastic materials on the front and back sides of the insert panel 60 can connect through the first additional through holes 62 and thus, the connected part of the thinner portion 52 increases in thickness by a comparable amount to the thickness L3 of the insert panel 60, enabling reinforcement of the thinner portion 52.

Figure 9:
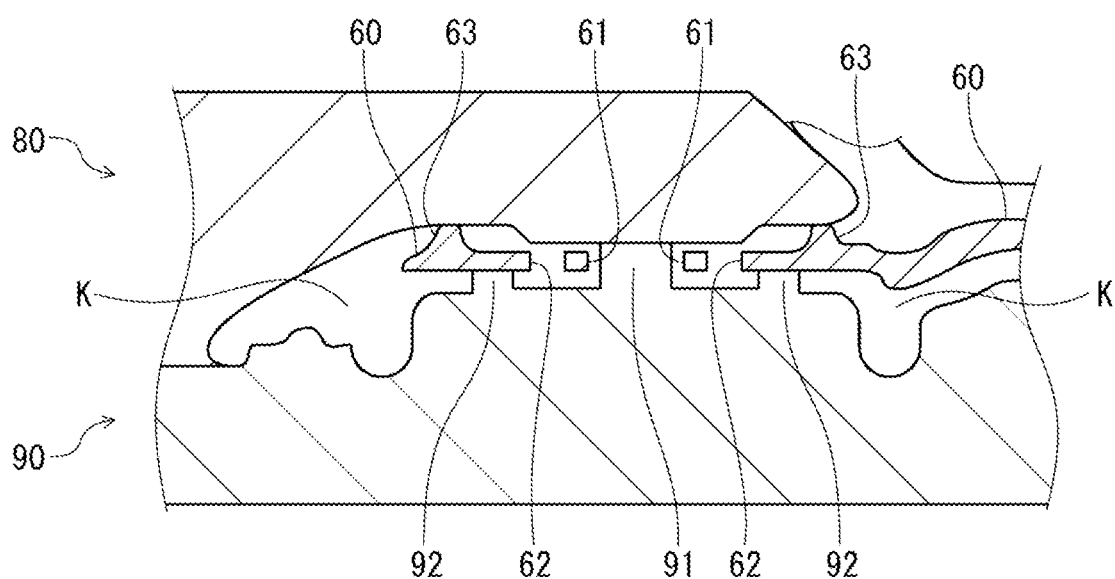
FIG. 9 is a cross-sectional view illustrating a state where the insert panel is placed within a cavity during molding of the molded part.

Further, as illustrated in FIGS. 6 to 8, the insert panel 60 has a mold abutting protrusion 63 protruding vertically from the front side of the insert panel 60 on an outer peripheral portion of an area thereof corresponding to the thinner portion 52, that is, at a location adjacent outwardly to the first additional through holes 62, to abut the mold. In the embodiment, four of the mold abutting protrusions 63 are each provided at respective locations of extension of directions from the clip through hole 61 toward the four first additional through holes 62; however, the number and location of the mold abutting protrusions 63 are not particularly limited to this configuration when the mold abutting protrusions 63 are provided adjacent outwardly to the first additional through holes 62. The term "adjacent outwardly to" herein designates an area being the outer peripheral portion of the thinner portion 52 of the molded part 50, particularly corresponding to the outer peripheral portion of the sloping portion 53 (see FIGS. 6 and 9). For example, the mold abutting protrusions 63 are positioned such that the distance from an outer peripheral edge of the clip through hole 61 to the mold abutting protrusion 63 is approximately two to five times greater than the distance from the outer peripheral edge of the clip through hole 61 to the outer peripheral edge of the first additional through hole 62. A height of the mold abutting protrusions 63 is not particularly limited; however, as illustrated in FIG. 9, the height of the mold abutting protrusions 63 is preferably determined such that the mold abutting protrusions 63 abut the upper mold 80 when the insert panel is set within the cavity formed by the upper and lower molds 80, 90 during molding of the molded part 50. Thus, when the elastic material is injected into the cavity K, the insert panel 60 can be prevented from misalignment toward the upper mold 80 by pressure of the injected elastic material.

As illustrated in FIG. 9, a plurality of lower mold protuberances 92 configured to abut the back side of the insert panel 60 are provided on the lower mold 90. In that instance, the insert panel 60 can be prevented from misalignment toward the lower mold 90 by pressure of the elastic material. The mold abutting protrusion 63 may be also provided on the back side of the insert panel 60 instead of providing the plurality of lower mold protuberances 92 on the lower mold 90. In that instance, the height of the mold abutting protrusion 63 is preferably determined such that the mold abutting protrusion 63 abuts the lower mold 90. The plurality of lower mold protuberances 92 provided on the lower mold 90 may also be combined with the mold abutting protrusion 63 provided on the back side of the insert panel 60. As illustrated in FIG. 9, the lower mold 90 then has a lower piercing protuberance 91 configured to abut the upper mold 80. The molded part through hole 51 is formed by the lower piercing protuberance 91.

Further, the insert panel 60 includes a second additional through hole 64 as a further additional through hole in the outer peripheral portion of the area corresponding to the thinner portion 52. In the embodiment, the second additional through hole 64 is formed between the mold abutting protrusions 63. The second additional through hole 64 may not be necessarily provided between the mold abutting protrusions 63. The second additional through hole 64 may be provided in the outer peripheral portion of the area corresponding to the thinner portion 52, that is, in a location adjacent outwardly to the first additional through hole 62. For example, the second additional through hole 64 is positioned such that the distance from the outer peripheral edge of the clip through hole 61 to an outer peripheral edge of the second additional through hole 64 is approximately two to five times greater than the distance from the outer peripheral edge of the clip through hole 61 to the outer peripheral edge of the first additional through hole 62. Such configuration results in added passageways of the elastic material that flows between the insert panel 60 and the mold and thus in improved flowability of the elastic material during molding of the molded part 50. Moreover, the elastic materials on the front and back sides of the insert panel 60 can connect through the second additional through hole 64, thus enabling further reinforcement of a portion adjacent to the molded part through hole 51.

As described above, the insert panel 60 has, adjacent to the clip through hole 61, the first additional through holes 62, the mold abutting protrusions 63, and the second additional through hole 64; however, a third additional through hole 65 and an additional mold abutting protrusion 66 other than those described above may be provided in an area away from the clip through hole 61. In FIG. 8, only some of the third additional through holes 65 and the additional mold abutting protrusions 66 have reference numeral since there are a number of the third additional through holes 65 and the additional mold abutting protrusions 66. The third additional through hole 65 enables the elastic materials on the front and back sides of the insert panel 60 to connect through the third additional through hole 65 and thus, the insert panel 60 is prevented from overall stripping within the molded part 50. The additional mold abutting protrusion 66 also abuts the upper mold 80 to prevent the insert panel 60 from being misaligned toward the upper mold 80, as with the mold abutting protrusions 63.

Figure 10:
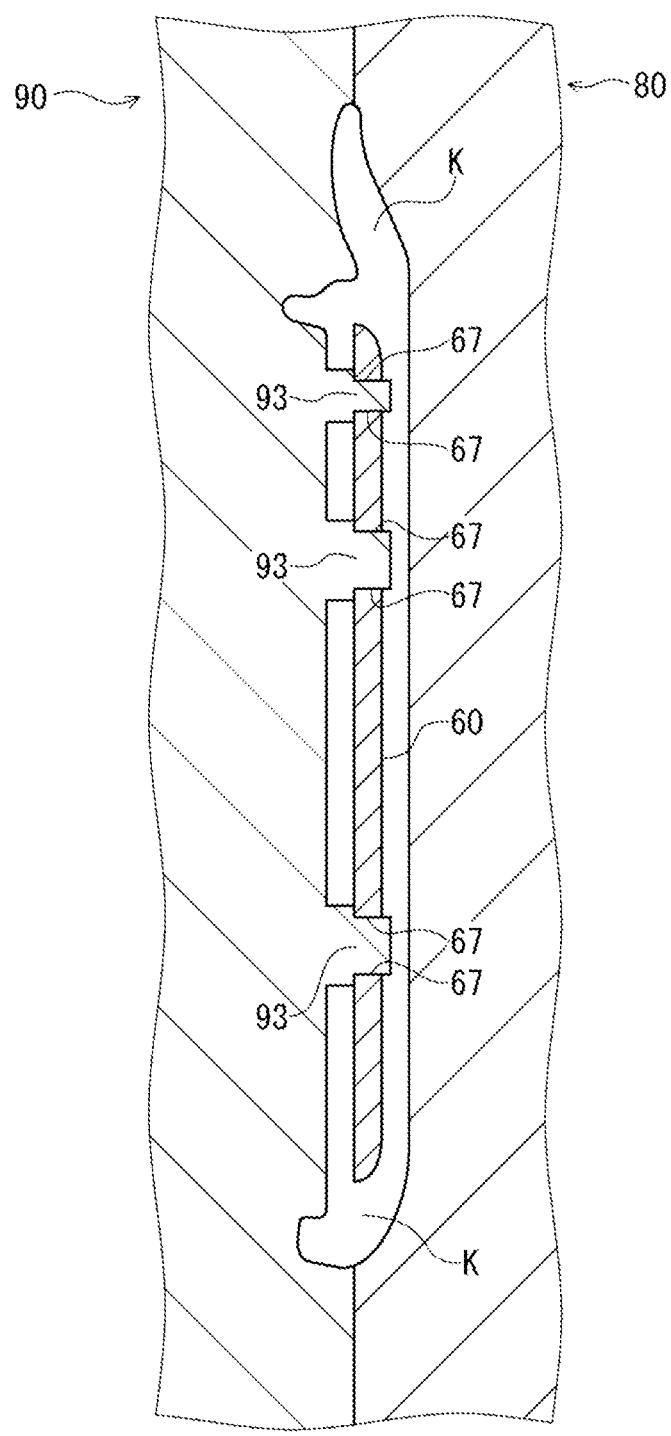
FIG. 10 is a cross-sectional view taken along a line X-X in FIG. 8, illustrating a state where the insert panel is placed in the cavity during molding of the molded part.

As illustrated in FIG. 8, the insert panel 60 further has an insert securing through hole 67 in addition to the third additional through hole 65. Still further, as illustrated in FIG. 10, an insert securing protuberance 93 of the lower mold 90 provided on the lower mold 90 can be inserted in the insert securing through hole 67 of the insert panel 60 during molding of the molded part 50 to prevent the insert panel 60 from being misaligned in a horizontal direction (a direction generally parallel with parting faces of the upper and lower molds 80, 90). Yet further, as illustrated in FIG. 10, the configuration that the insert securing protuberance 93 of the lower mold 90 provided on the lower mold 90 passes through the insert securing through hole 67 is shown; however, the insert securing through hole 67 may have a structure where the insert securing protuberance 93 of the lower mold does not pass through, rather than being a through hole (not shown). In any case, it is preferred that the insert securing protuberance 93 and the insert securing through hole 67 have substantially a same diameter and the elastic material of the molded part 50 does not flow into the insert securing through hole 67, since this allows reduced movement of the insert panel 60 in the horizontal direction. Yet further, as illustrated in FIG. 10, at least two or more of the insert securing through holes 67 are necessary since one insert securing through hole 67 may allow rotation of the insert panel 60 due to pressure of injection of the molding material. The shape of the insert securing through holes 67 is then not particularly limited. The shape preferably includes a straight portion, rather than being a circle.

As described above, the embodiment describes and illustrates the weatherstrip configured to attach to the front door. The present disclosure is however not limited to this configuration. The present disclosure is also applicable to a weatherstrip configured to attach to a rear door. The present disclosure is also applicable to a weatherstrip for attaching to a body other than the weatherstrip for attaching to the door. Further, the present disclosure is applicable to all kinds of weatherstrips where an insert panel is embedded within a molded part and then a clip is passed through a through hole of the insert panel for attachment.

The invention claimed is:

1. A weatherstrip comprising:
   a molded part formed from an elastic material, the molded part having an insert panel embedded therein, the molded part including:
      a molded part through hole in which a clip for attaching the molded part to a vehicle body can be inserted; and
      a thinner portion provided in an outer peripheral portion of the molded part through hole and having a thickness smaller than that of other portions of the molded part in an area of the molded part where the insert panel is embedded,
   wherein the insert panel includes:
      a clip through hole provided at a location corresponding to the molded part through hole and having a diameter larger than that of the molded part through hole; and
      a first additional through hole provided spaced from the clip through hole in an area corresponding to the thinner portion, and
   wherein the elastic material located on a front side of the insert panel is connected to the elastic material located on a back side of the insert panel through the first additional through hole,
   wherein the first additional through hole includes a plurality of first additional through holes positioned at equal intervals along the entire outer periphery of the clip through hole, and a total of lengths of the plurality of first additional through holes is larger than a total of spacings among the plurality of first additional through holes,
   wherein the length of the first additional through hole is the distance between two points spaced furthest away from one another at the outer peripheral edge of the first additional through hole, and
   wherein the spacing between the first additional through holes is the distance between two closest points of the outer peripheral edges of adjacent first additional through holes.

2. The weatherstrip according to claim 1, wherein the insert panel includes a mold abutting protrusion protruding vertically from the front side or the back side of the insert panel on an outer peripheral portion of the area corresponding to the flat thinner portion, to abut a mold.

3. The weatherstrip according to claim 1, wherein the insert panel further includes a second additional through hole in the outer peripheral portion of the area corresponding to the flat thinner portion, and
   wherein the elastic material located on the front side of the insert panel is connected to the elastic material located on the back side of the insert panel through the second additional through hole.

4. The weatherstrip according to claim 1, wherein the first additional through hole is arch shaped and curves adjacent to an outer periphery of the clip through hole.

5. A weatherstrip comprising:
   a molded part formed from an elastic material, the molded part having an insert panel embedded therein, the molded part including:
      a molded part through hole in which a clip for attaching the molded part to a vehicle body can be inserted; and
      a thinner portion provided in an outer peripheral portion of the molded part through hole and having a thickness smaller than that of other portions of the molded part in an area of the molded part where the insert panel is embedded,
   wherein the insert panel includes:
      a clip through hole provided at a location corresponding to the molded part through hole and having a diameter larger than that of the molded part through hole; and
      a first additional through hole provided spaced from the clip through hole in an area corresponding to the thinner portion, and
   wherein the elastic material located on a front side of the insert panel is connected to the elastic material located on a back side of the insert panel through the first additional through hole,
   wherein the first additional through hole is arch shaped and curves adjacent to an outer periphery of the clip through hole.

6. The weatherstrip according to claim 5, wherein the first additional through hole is equally distance apart from and surrounding the outer periphery of the clip through hole.

7. The weatherstrip according to claim 5, wherein the first additional through hole includes a plurality of first additional through holes, and a total of lengths of the plurality of first additional through holes is larger than a total of spacings among the plurality of first additional through holes,
   wherein the length of the first additional through hole is the distance between two points spaced furthest away from one another at the outer peripheral edge of the first additional through hole,
   wherein the spacing between the first additional through holes is the distance between two closest points of the outer peripheral edges of adjacent first additional through holes.

8. The weatherstrip according to claim 5, wherein the insert panel includes a mold abutting protrusion protruding vertically from the front side or the back side of the insert panel on an outer peripheral portion of the area corresponding to the flat thinner portion, to abut a mold.

9. The weatherstrip according to claim 5, wherein the insert panel further includes a second additional through hole in the outer peripheral portion of the area corresponding to the flat thinner portion, and
   wherein the elastic material located on the front side of the insert panel is connected to the elastic material located on the back side of the insert panel through the second additional through hole.

* * * * *